United States Patent
Hattori et al.

(10) Patent No.: US 7,924,277 B2
(45) Date of Patent: Apr. 12, 2011

(54) THREE-DIMENSIONAL MODEL DEFORMATION SYSTEM, METHOD AND COMPUTER READABLE PROGRAM, AND COMPUTER READABLE STORAGE MEDIUM STORING THAT PROGRAM

(75) Inventors: Kazuyuki Hattori, Nishikamo-gun (JP); Hitoshi Misawa, Nishikamo-gun (JP); Junji Ishida, Nagoya (JP); Tadashi Kotani, Nagoya (JP); Takaya Hashimoto, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 910 days.

(21) Appl. No.: 11/816,187

(22) PCT Filed: Mar. 28, 2006

(86) PCT No.: PCT/JP2006/306332
§ 371 (c)(1),
(2), (4) Date: Aug. 14, 2007

(87) PCT Pub. No.: WO2006/106686
PCT Pub. Date: Oct. 12, 2006

(65) Prior Publication Data
US 2009/0207168 A1 Aug. 20, 2009

(30) Foreign Application Priority Data

Apr. 4, 2005 (JP) ................. 2005-107722

(51) Int. Cl.
*G06T 15/00* (2006.01)
(52) U.S. Cl. ........ 345/419; 345/420; 345/619; 345/672; 715/964
(58) Field of Classification Search .................. 345/419, 345/420, 619, 672; 707/96, 97, 98, 791, 707/796; 715/964
See application file for complete search history.

(56) References Cited

U.S. PATENT DOCUMENTS 5,923,573 A 7/1999 Hatanaka
(Continued)

FOREIGN PATENT DOCUMENTS

JP 9 223242 8/1997
(Continued)

OTHER PUBLICATIONS

Dae-Eun Hyun, et al., "Modeling and Deformation of Arms and Legs Based on Ellipsoidal Sweeping", Proceedings of the 11$^{th}$ Pacific Conference on Computer Graphics and Applications, XP010662572, Oct. 8, 2003, 9 pages.

(Continued)

*Primary Examiner* — Phu Nguyen
(74) *Attorney, Agent, or Firm* — Oblon, Spivak, McClelland, Maier & Neustadt, L.L.P.

(57) ABSTRACT

A three-dimensional model modification system for modifying a three-dimensional model, defined by a plurality of surfaces and representing an arbitrary object is disclosed. The system includes a base-curve generating unit fitting skeleton lines, representing a prerecorded approximate outline of the object, to a three-dimensional model to be modified and generating base curves, representing an approximate outline of the three-dimensional model; a first polygon forming unit generating a group of points from the three-dimensional model; a base-curve modifying unit arbitrarily modifying the base curves of the three-dimensional model, according to an instruction from an operator; a group-of-points displacing/determining unit displacing the group of points based on base curve displacements from the base curves before arbitral modification to the base curves after arbitrary modification; and a second polygon forming unit generating a three-dimensional model defined by a plurality of surfaces formed from the group of points.

5 Claims, 9 Drawing Sheets

U.S. PATENT DOCUMENTS 6,204,860 B1     3/2001   Singh
6,919,888 B1 *   7/2005   Perani et al. .................. 345/420
7,444,195 B2 *   10/2008   Smith et al. .................... 700/97

FOREIGN PATENT DOCUMENTS

| | | |
|---|---|---|
| JP | 9 326046 | 12/1997 |
| JP | 10 289262 | 10/1998 |
| JP | 2002 15310 | 1/2002 |
| JP | 2002 269586 | 9/2002 |
| JP | 2002 304638 | 10/2002 |
| JP | 2003 30254 | 1/2003 |
| JP | 2004 78309 | 3/2004 |

OTHER PUBLICATIONS

Yu Wang, et al., "Fast Energy-Based Surface Wrinkle Modeling", Computer and Graphics, XP025088801, vol. 30, No. 1, pp. 111-125.

* cited by examiner

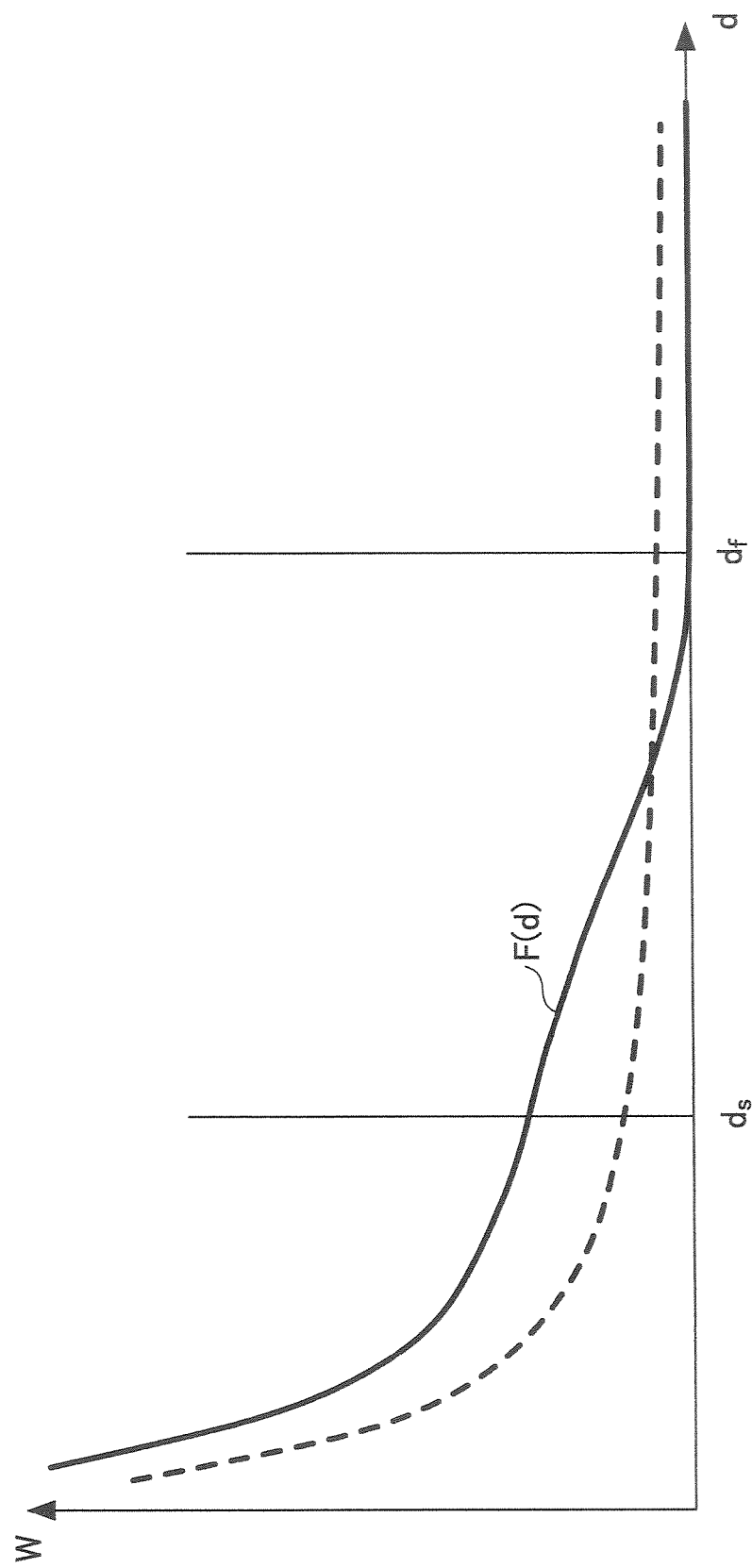

THREE-DIMENSIONAL MODEL DEFORMATION SYSTEM, METHOD AND COMPUTER READABLE PROGRAM, AND COMPUTER READABLE STORAGE MEDIUM STORING THAT PROGRAM

BACKGROUND OF THE INVENTION

1. Field of the Invention

The present invention generally relates to a three-dimensional model modification system for modifying a three-dimensional model defined by plural surfaces, a method of the same, a computer-readable program of the same, and a computer-readable recording medium storing the program, and more particularly to a three-dimensional model modification system that can modify a three-dimensional model in a short time while keeping the design intention unchanged, a method of the same, a computer-readable program of the same, and a computer-readable recording medium storing the program.

2. Description of the Related Art

Conventionally, there has been known a three-dimensional model modification system for modifying (morphing) a three-dimensional model (three-dimensional figure) defined by plural surfaces, a method of the same, and a computer-readable program of the same.

In the meantime, however, when a three-dimensional model is being globally modified using, for example, an enlarge/reduce function in a commercially available CAD system, it is not possible to modify the three-dimensional model while keeping the design intention unchanged. For example, when an operator wishes to keep a circular form unchanged during the modification, there is a high possibility that the circular norm will be changed into an ellipsoidal form as the modification is performed.

In view of the above point, there have been proposed systems intended to globally modify a three-dimensional model while keeping the design intention unchanged by setting plural constraint points in the three-dimensional model (See for example, Patent Documents 1 and 2).

Patent Document 1 discloses a system modifying a three-dimensional model modification system by setting one or more operating points on a cross-sectional contour of the three-dimensional model and moving the operating points to set a target contour figure; thus the three-dimensional model is modified by moving the one or more operating points to generate the target contour figure.

Patent Document 2 discloses a system in which one or more operating points are set on a surface of a three-dimensional model, the operating points are moved on the surface of a target three-dimensional model, and thus the model is globally modified based on the movement of the operating points.

Patent Document 1: Japanese Patent Application Publication No: 2002-269586
Patent Document 2: Japanese Patent Application Publication No: 2004-78309

However, in a conventional system, it is not possible to keep the design intention under plural restraint conditions. For example, when a three-dimensional figure including plural surfaces mutually constrained by each other is being globally modified under prescribed constraint conditions using a parametric function of commercially available CAD software, it requires an enormous number of arithmetic steps and enormous processing time.

Furthermore, in systems disclosed in Patent Documents 1 and 2, since it is necessary to set the operating points on plural of surfaces of a three-dimensional model and move each operating point to modify the entire three-dimensional model, it requires time and effort to set the operating points and it is difficult to set the operating points in advance while having an image of the modified figure (design). In addition, when moving the operating points, it is difficult to obtain the modified image figure of the three-dimensional model, therefore the design intention of the operator may not be reflected in the modified model.

The present invention was made to solve the problems, it is a primary object of the present invention to provide a three-dimensional model modification system that modifies a three-dimensional model in a shorter time while keeping the design intention of the three-dimensional model substantially unchanged, a method of the same, a computer-readable program of the same, and a computer-readable recording medium storing the program.

SUMMARY OF THE INVENTION

According to a first aspect of the present invention to achieve the object, there is provided a three-dimensional model modification system for modifying a three-dimensional model, defined by a plurality of surfaces and representing an arbitrary object. The system includes a base-curve generating unit fitting skeleton lines, representing a prerecorded approximate outline of the object, to a three-dimensional model to be modified and generating base curves, representing an approximate outline of the three-dimensional model; a first polygon forming unit generating a group of points from the three-dimensional model to be modified; a base-curve modifying unit arbitrarily modifying the base curves of the three-dimensional model, generated by the base-curve generating unit, according to an instruction from an operator; a group-of-points displacing/determining unit displacing the group of points, generated by the first polygon forming unit and representing the three-dimensional model to be modified, based on base curve displacements from the base curves, generated by the base-curve generating unit before arbitrary modification, to the base curves, generated by the base-curve modifying unit after arbitrary modification, and determining a group of points corresponding to the base curves, generated by the base-curve modifying unit after arbitrary modification; and a second polygon forming unit generating a three-dimensional model defined by a plurality of surfaces formed from the group of points determined by the group-of-points displacing/determining unit.

In the first aspect of the present invention, the three-dimensional model (that is not yet modified and) inputted to the system refers to a three-dimensional figure having the freeform surfaces generated by, for example, the CAD software.

According to the first aspect of the present invention, the base curves are introduced and used to be arbitrarily modified; based on the displacements of the base curves, the three-dimensional model is modified. This is because, in a three-dimensional model defined by plural surfaces, the surfaces are restrained by each other under relatively high restraint conditions by its nature. On the other hand, the elements of base curves are restrained by each other under relatively low restraint conditions. As a result, it is possible to keep the design intention substantially unchanged and to reduce the number of arithmetic steps.

Further, in the first aspect of the present invention, preferably, the above-mentioned three-dimensional model modification system further includes a display unit showing the operator the base curves before and after the modification, the group of points before and after the modification, and a modification process of the base curves, being modified by the base-curve modifying unit, so that the operator can arbitrarily modify the base curves while having the image of the base curves that are modified.

According to a second aspect of the present invention to achieve the object, there is provided a three-dimensional model modification method for modifying a three-dimensional model, defined by a plurality of surfaces and representing an arbitrary object. The method includes the steps of: a base-curve generating step of fitting skeleton lines, representing a prerecorded approximate outline of the object, to a three-dimensional model to be modified and generating base curves, representing an approximate outline of the three-dimensional model; a first polygon forming step of generating a group of points from the three-dimensional model to be modified; a base-curve modifying step of arbitrarily modifying the base curves of the three-dimensional model, generated by the base-curve generating step, according to an instruction from an operator; a group-of-points displacing/determining step of displacing the group of points, generated by the first polygon forming step and representing the three-dimensional model to be modified, based on base curve displacements from the base curves, generated by the base-curve generating step before arbitrary modification, to the base curves, generated by the base-curve modifying step after arbitrary modification, and determining a group of points corresponding to the base curves, generated by the base-curve modifying step after arbitrary modification; and a second polygon forming step of generating a three-dimensional model defined by a plurality of surfaces formed from the group of points determined by the group-of-points displacing/determining step.

In the second aspect of the present invention, the three-dimensional model (that is not yet modified and) processed in the above method refers to three-dimensional figure having the free-form surfaces generated by, for example, the CAD software.

According to the second aspect of the present invention, the base curves are introduced and used to be arbitrarily modified, and based on the displacements of the base curves, the three-dimensional model is modified. This is because in a three-dimensional model defined by plural surfaces, the surfaces are restrained to each other under relatively high restraint conditions by the nature of the model, while the elements of base curves are restrained by each other under relatively low restraint conditions. As a result, it is possible to keep the design intention substantially unchanged and to reduce the number of arithmetic steps.

Further, in the second aspect of the present invention, preferably, the above-mentioned three-dimensional model modification method further includes a display step of showing the operator the base curves before and after the modification, the group of points before and after the modification, and a modification process of the base curves, being modified by the base-curve modifying step.

According to a third aspect of the present invention to achieve the object, there is provided a computer-readable three-dimensional model modification program causing a computer, upon executed, to execute processes of modifying a three-dimensional model, defined by a plurality of surfaces and representing an arbitrary object. The processes includes a base-curve generating process causing the computer to fit skeleton lines, representing a prerecorded approximate outline of the object, to a three-dimensional model to be modified and generating base curves, representing an approximate outline of the three-dimensional model; a first polygon forming process causing the computer to generate a group of points from the three-dimensional model to be modified; a base-curve modifying process causing the computer to arbitrarily modify the base curves of the three-dimensional model, generated by the base-curve generating process, according to an instruction from an operator; a group-of-points displacing/determining process causing the computer to displace the group of points, generated by the first polygon forming process and representing the three-dimensional model to be modified, based on base curve displacements from the base curves, generated by the base-curve generating process before arbitrary modification, to the base curves, generated by the base-curve modifying process after arbitrary modification, and determine a group of points corresponding to the base curves, generated by the base-curve modifying process after arbitrary modification; and a second polygon forming process that causes the computer to generate a three-dimensional model defined by a plurality of surfaces formed from the group of points determined by the group-of-points displacing/determining process.

In the third aspect of the present invention, the three-dimensional model (that is not yet modified and) processed by the computer-readable program refers to a three-dimensional figure having free-form surfaces generated by, for example, the CAD software.

According to the third aspect of the present invention, the base curves are introduced and used to be arbitrarily modified, and based on the displacements of the base curves, the three-dimensional model is modified. This is because, in a three-dimensional model defined by plural surfaces, the surfaces are restrained by each other under relatively high restraint conditions by the nature of the model, while the elements of base curves are restrained by each other under relatively low restraint conditions. As a result, it is possible to keep the design intention substantially unchanged and to reduce the number of arithmetic steps.

According to a fourth aspect of the present invention to achieve the object, there is provided a computer-readable recording medium storing a computer-readable three-dimensional model modification program for modifying a three-dimensional model, defined by a plurality of surfaces and representing an arbitrary object, the computer-readable three-dimensional model modification program, upon executed by a computer, causing the computer to execute processes. The processes comprising a base-curve generating process of fitting skeleton lines, representing a prerecorded approximate outline of the object, to a three-dimensional model to be modified and generating base curves, representing an approximate outline of the three-dimensional model; a first polygon forming process of generating a group of points from the three-dimensional model to be modified; a base-curve modifying process of arbitrarily modifying the base curves of the three-dimensional model, generated by the base-curve generating process, according to an instruction from an operator; a group-of-points displacing/determining process of displacing the group of points, generated by the first polygon forming process and representing the three-dimensional model to be modified, based on base curve displacements from the base curves, generated by the base-curve generating process before arbitrary modification, to the base curves, generated by the base-curve modifying process after arbitrary modification, and determining a group of points corresponding to the base curves, generated by the base-curve modifying process after arbitrary modification; and a second polygon forming process of generating a three-dimensional model defined by a plurality of surfaces formed from the group of points determined by the group-of-points displacing/determining process.

In the fourth aspect of the present invention, the three-dimensional model (that is not yet modified and) processed by the computer-readable program refers to three-dimensional figure having free-form surfaces generated by, for example, the CAD software.

According to the fourth aspect of the present invention, the base curves are introduced and used to be arbitrarily modified, and based on the displacements of the base curves, the three-dimensional model is modified. This is because in a three-dimensional model defined by plural surfaces, the surfaces are restrained by each other under relatively high restraint conditions by the nature of the model, while the elements of base curves are restrained by each other under relatively low restraint conditions. As a result, it is possible to keep the design intention substantially unchanged and to reduce the number of arithmetic steps.

According to the embodiments of the present invention, there are provided a three-dimensional model modification system that modifies a three-dimensional model in a shorter period while keeping design intention thereof substantially unchanged, a method of the same, a computer-readable program of the same, and a computer-readable recording medium storing the program.

BRIEF DESCRIPTION OF DRAWINGS

FIG. 11 is a graph illustrating weighting in another example (gravity force model) in step 204 in the flowchart in FIG. 2.

EXPLANATION OF REFERENCE NUMBERS

100: THREE-DIMENSIONAL MODEL MODIFICATION SYSTEM
101: THREE-DIMENSIONAL MODEL CAPTURING UNIT
102: USER INPUT UNIT
103: MEMORY UNIT
104: ARITHMETIC AND CONTROL UNIT
105: DISPLAY UNIT

DETAILED DESCRIPTION OF THE PREFERRED EMBODIMENT

Exemplary embodiments according to the present invention are explained below with reference to the accompanying drawings with an example. It should be noted that detailed explanations with respect to the basic concept of a three-dimensional model modification system for modifying a three-dimensional model defined by plural surfaces as well as the system main hardware configuration, operating principle, basic controlling method, and the like are omitted as they are known to a person skilled in the art.

Furthermore, in embodiments described below, a case is explained where a three-dimensional model representing the entire outline of a vehicle is modified for modifying the design of the vehicle.

Example

A three-dimensional model modification system according to one embodiment of the present invention is explained below with reference to the FIGS. 1 through 7.

Figure 1:
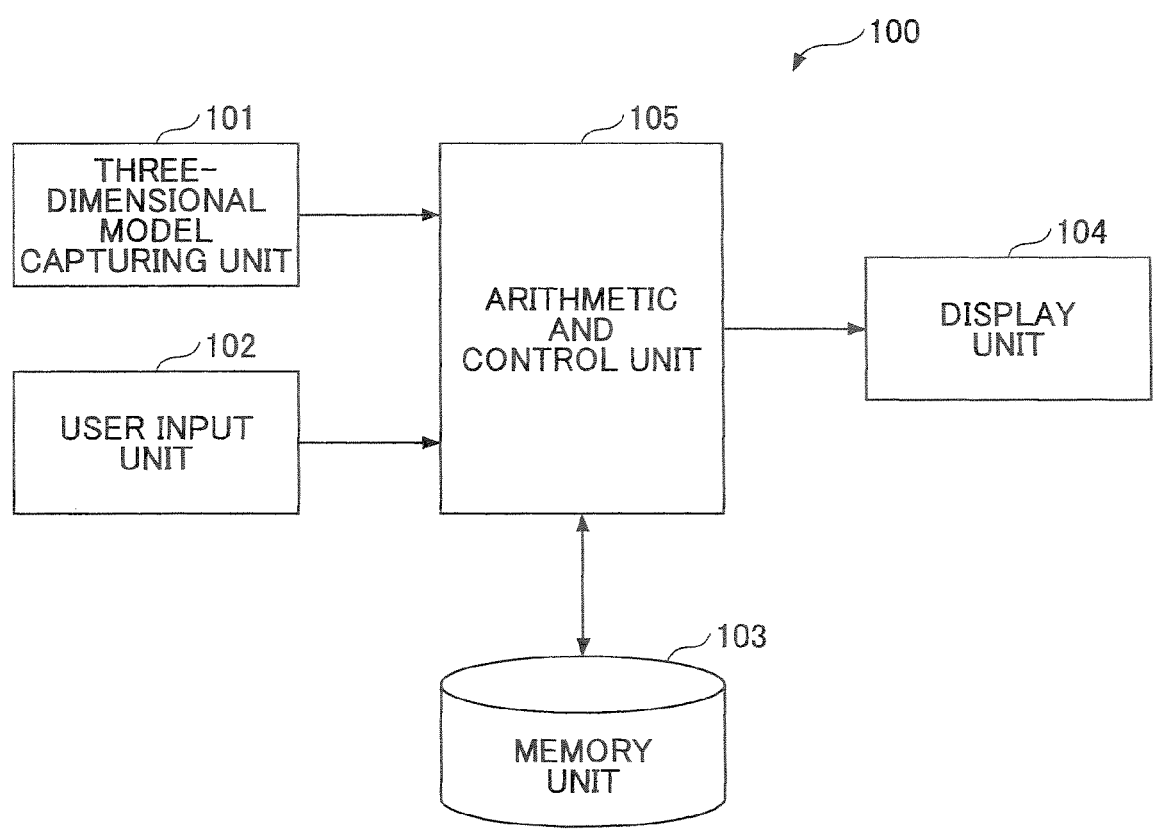
FIG. 1 is schematic drawing showing a three-dimensional model modification system according to one embodiment of the present invention.

FIG. 1 is a schematic diagram showing a three-dimensional model modification system 100 according to one embodiment of the present invention.

The three-dimensional model modification system 100 includes a three-dimensional model capturing unit 101 that captures a three-dimensional model representing an arbitrary object for the system. Herein, the three-dimensional model refers to a three-dimensional figure defined by plural surfaces, consisting of free-form surfaces generated by, for example, a CAD system.

The three-dimensional model modification system 100 further includes a user input unit 102 that receives operational inputs from a user. The user input unit 102 includes one or more user input devices such as a mouse, a track pad, and a keyboard.

The three-dimensional model modification system 100 still further includes a memory unit 103 that records and stores one or more skeleton lines. The memory unit 103 may be any recording medium. In the embodiments, plural skeleton line data (e.g. for 1BOX/2BOX, for pickup, and for 3BOX) of a three-dimensional model representing the entire outline of a vehicle are previously recorded in the memory unit 103.

The three-dimensional model modification system 100 still further includes a display unit 104 that provides a visual display of the base curves (explained below) before and after modification, a group of points (explained below) before and after modification, and a modification process of the base curves to the user. The display unit 104 may be, for example, a display device.

The three-dimensional model modification system 100 still further includes an arithmetic and control unit 105 that performs various arithmetic processing explained below and totally controls each of the above-mentioned units. The arithmetic and control unit may be, for example, a Central Processing Unit (CPU).

Figure 2:
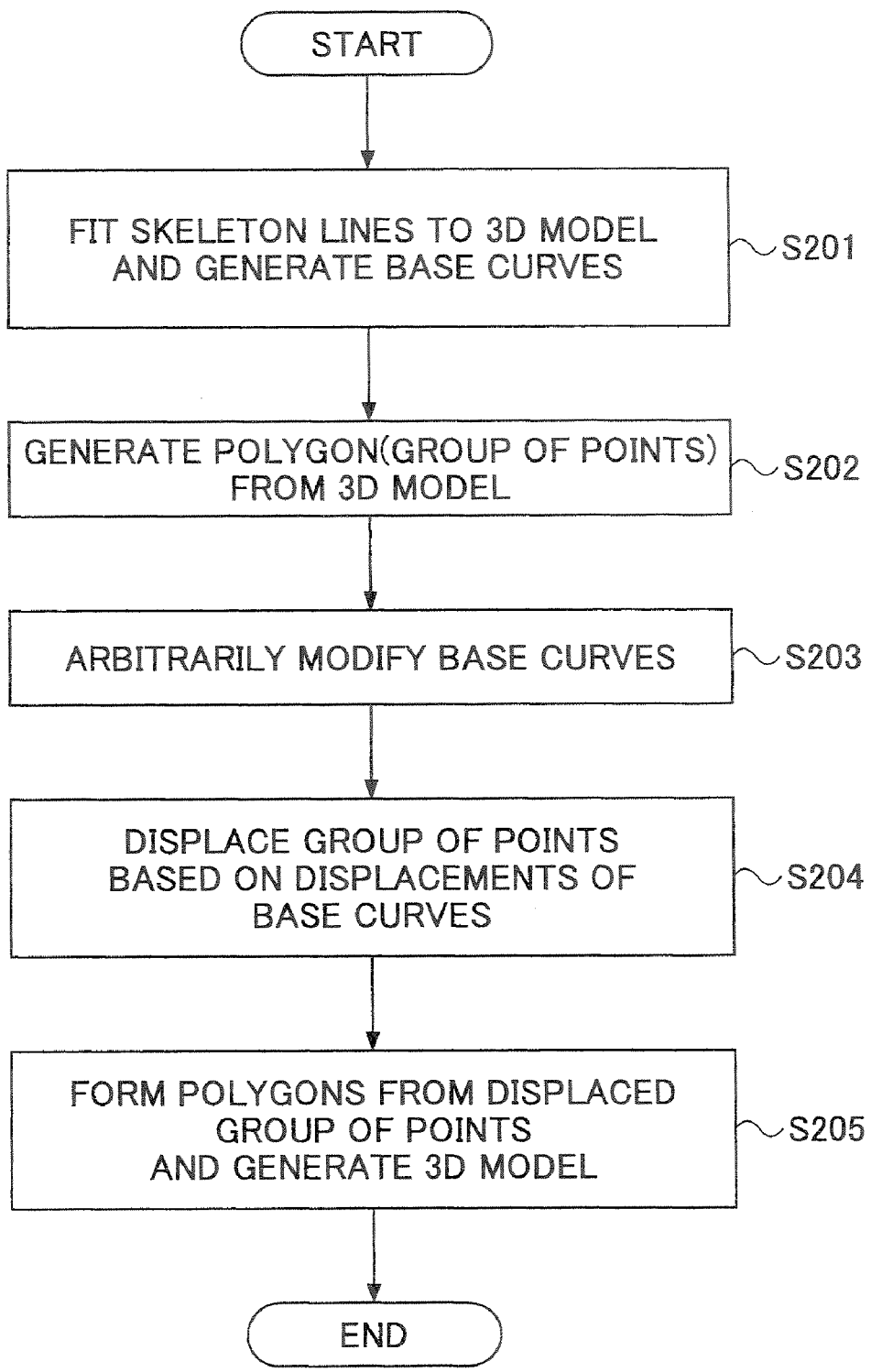
FIG. 2 is a flowchart showing a process flow of the three-dimensional model modification system according to one embodiment of the present invention.
Figure 3:
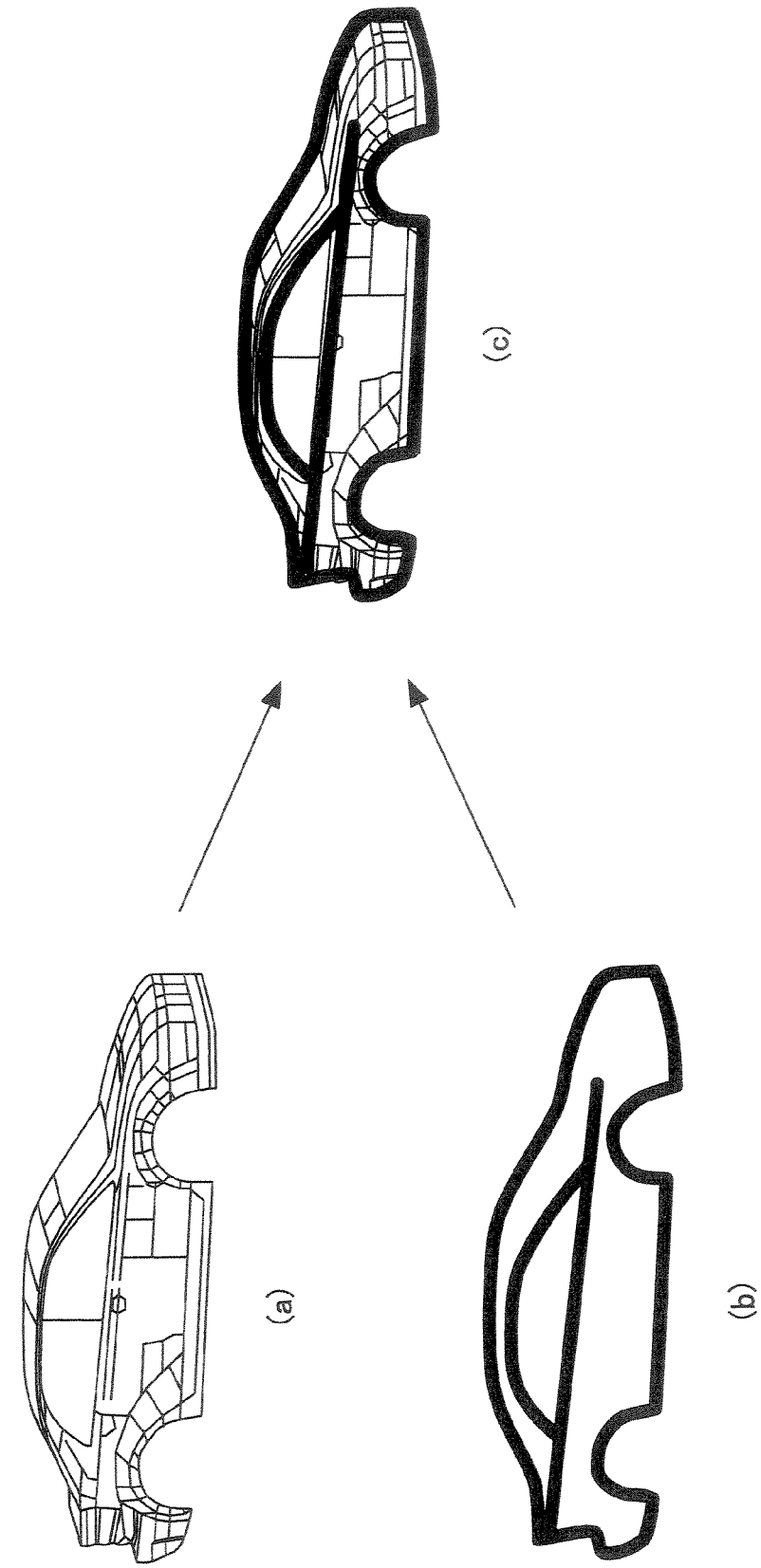
FIG. 3 is a pattern diagram schematically showing a process in step 201 in the flowchart in FIG. 2.
Figure 4:
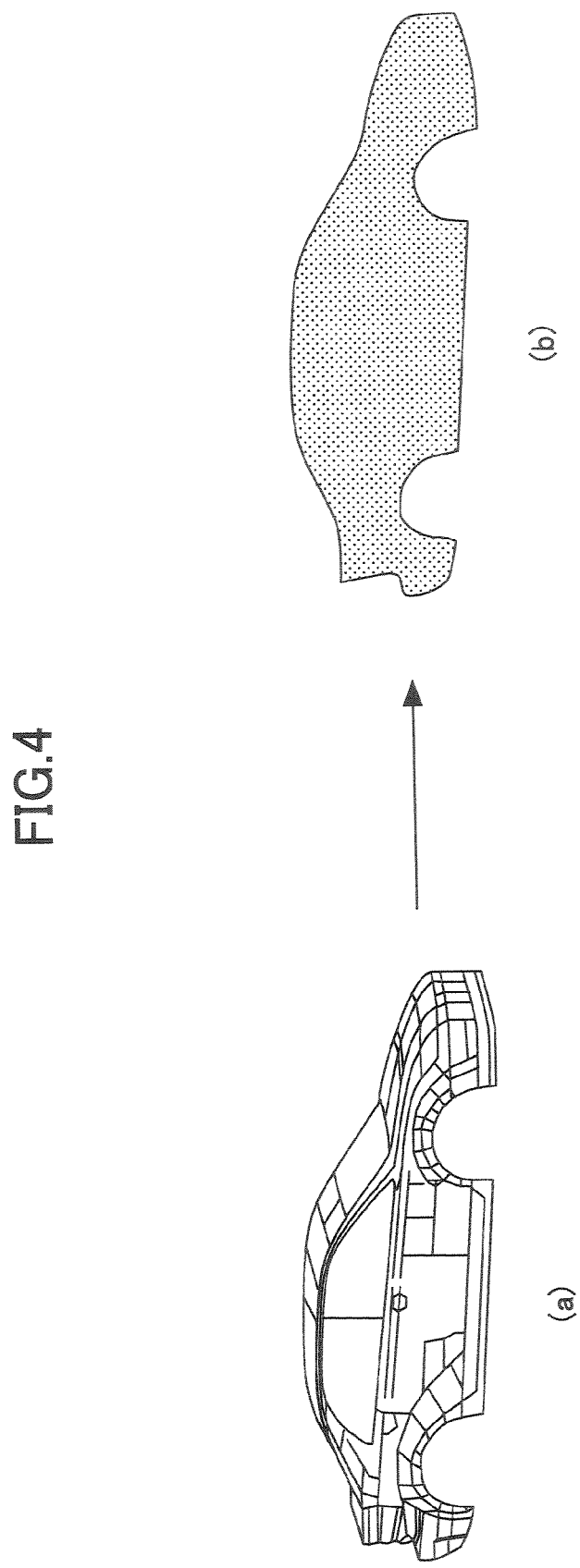
FIG. 4 is a pattern diagram schematically showing a process in step 202 in the flowchart in FIG. 2.

Next, functions and operations of the three-dimensional model modification system 100 having such a configuration are explained with reference to FIGS. 2 through 6. FIG. 2 is a flowchart showing a processing flow of the three-dimensional model modification system 100 according to the embodiment of the present invention FIGS. 3 through 6 are pattern diagrams each schematically showing a process of the steps in FIG. 2.

First, when the three-dimensional model capturing unit 101 captures and loads a three-dimensional model to be modified (FIG. 3(A)) into the system, the arithmetic and control unit 105 extracts the skeleton lines (FIG. 3(b)) which are most appropriate for the three-dimensional model from the memory unit 103, and fits the extracted skeleton lines to the three-dimensional model (step 201 in FIG. 2).

This fitting process can be carried out by using a conventional curve modification method (for example, by moving the control points). In this case, the skeleton lines are modified so as to contact at least a part of a surface of the three-dimensional model without changing the three-dimensional model or its topology (FIG. 3(c)).

In this case, while the three-dimensional model is defined by plural surfaces, or free-form surfaces, the skeleton lines are defined by plural of curves, or free-form lines. Therefore, the skeleton lines are constrained by each other under relatively low restraint conditions, and it is possible to reduce the number of arithmetic steps and to facilitate the operations to modify the three-dimensional model.

Hereinafter, the skeleton line that is modified so as to be fit in a three-dimensional model to be modified is referred to as a base curve of the three-dimensional model. The arithmetic and control unit 105 controls the display unit 104 to show the generated base curves to the user.

Next, the arithmetic and control unit 105 forms polygons from the free-form surfaces (FIG. 4(a)) of the three-dimensional model captured by the three-dimensional model capturing unit 101 and generates a group of points (FIG. 4(b)) representing the free-form surfaces (step 202 in FIG. 2). A detailed explanation of a specific method for generating a group of points from surfaces is omitted as it is known to a person skilled in the art and also is achieved by a function of a commercially available CAD system.

Figure 5:
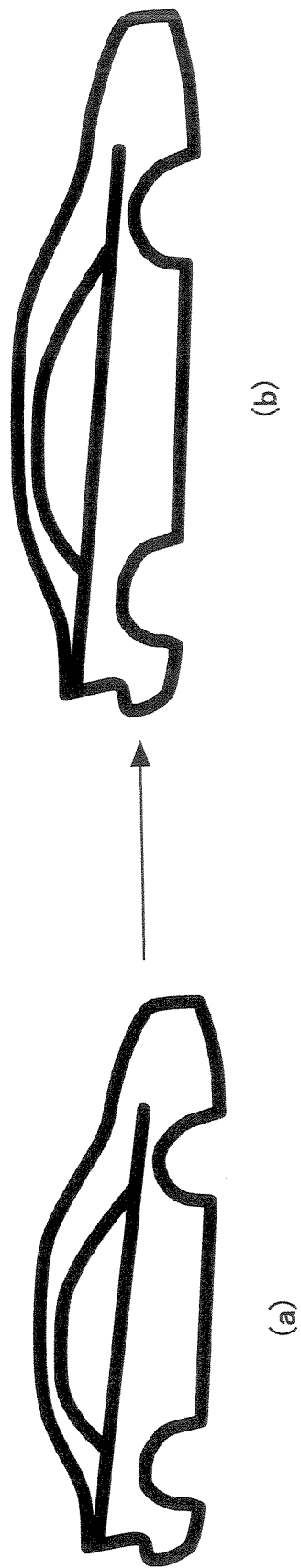
FIG. 5 is a pattern diagram schematically showing a process in step 203 in the flowchart in FIG. 2.
Figure 6:
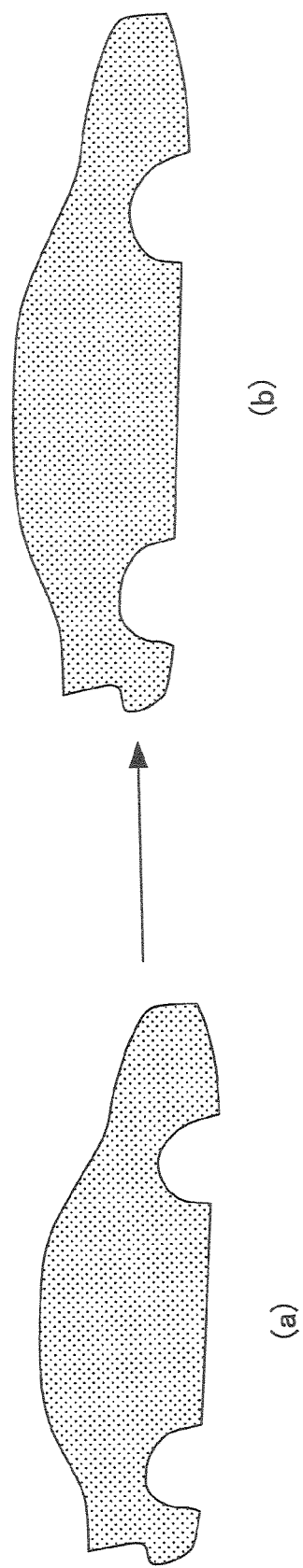
FIG. 6 is a pattern diagram schematically showing a process in step 204 in the flowchart in FIG. 2.

Next, the arithmetic and control unit 105 modifies the base curves generated in step 201 based on the user's operations input by way of the user input unit 102 (step 203 in FIG. 2). FIG. 5 shows one example where, according to the user's instruction (with respect to the extending direction and the value), the base curves (a), generated in step 201 (before modification), are modified so that the size of a vehicle is extended only in the longitudinal direction, while keeping the vehicle topology substantially unchanged, to generate the base curves (b) that have been modified.

The arbitrary modification of the base curves can be achieved by a method similar to that in step 201. When a parametric function of commercially available CAD software is used, it is easy to generate a modified base curve by specifying and changing, for example, a certain length of a curve only.

The arithmetic and control unit 105 controls the display unit 104 to show the modified base curves (FIG. 5(b)) to the user. In addition, it is preferable to show a modification process (that is, changing status corresponding to each input) from base curves before modification (FIG. 5(a)) to the base curves after modification (FIG. 5(b)) to the user while the user inputs an instruction to modify the base curves so that the user can have an image of the base curves that the user wishes to generate.

Next, the arithmetic and control unit 105 displaces the group of points, representing the three-dimensional model to be modified and generated in step 202 (step 204 in FIG. 2), according to the displacements of the base curves based on the modification of the base curves in FIG. 5. In other words, the group of points (FIG. 6(b)) is determined when the group of points (FIG. 6(a)) generated in step 202 is displaced in the same manner as in a case where the base curves before modification (FIG. 5(a)) displaced to the base curves after modification (FIG. a(b)).

After the group of points is modified according to the base curve modification by the user's instructions, the arithmetic and control unit 105 forms polygons from the group of points thus modified to generate a group of surfaces, that is, a modified three-dimensional model (step 205 in FIG. 2).

In this manner, modification of a three-dimensional model based on modification of base curves is achieved.

Two calculation methods of displacing a group of points after the displacement in step 204 in FIG. 2 are explained below. Herein, first and second methods are tentatively called a least square method and a gravity force method, respectively.

(Least Square Model)

Figure 7:
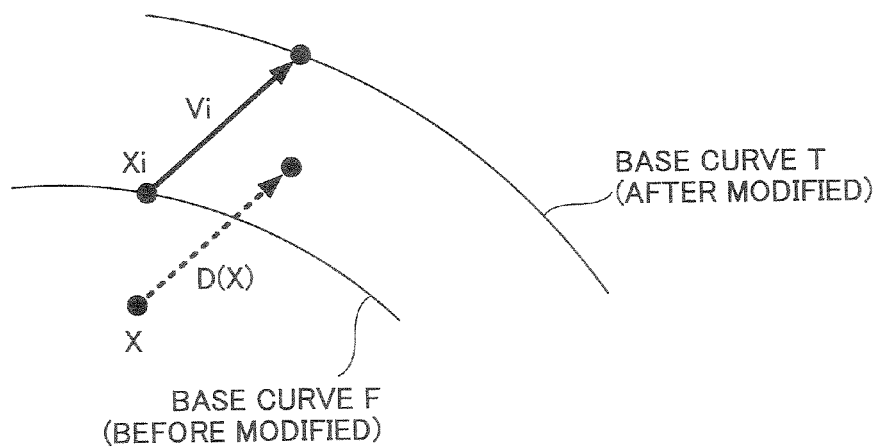
FIG. 7 is a drawing showing displacement of a group of points in one example (Least square model) in step 204 in the flowchart in FIG. 2.

First, the first calculation method of a least square model is explained with reference to FIG. 7. The position of each point in a group of points is determined in a small local portion as shown in FIG. 7 for simplifying purposes in this case when each point of the group of points before modification is displaced in accordance with the displacement of the base curve from the base curve F to the base curve T.

In this embodiment of the present invention, a point $X_i(=x_i, y_i, z_i)$ on the base curve F before modification is moved to a point on the base curve T after modification according to a displacement vector $V_i(=(u_i, V_i, W_i))$ (i=1, 2, ..., N). Further, according to this, each point X in a group of points is displaced according to a displacement function D(x):

[Equation 1]

$$M = \sum_{i=1,\ldots,N} \|D(X_i) - V_i\|^2 + \alpha E \tag{1}$$

Here, a displacement function D(X) to minimize above M is determined. In the calculation determining the minimum of M, a coefficient $\alpha$ is set to 1 ($\alpha=1$) in this embodiment.

In the above equation (1), the displacement function D(X) is defined as follows using B-Spline basis functions $N_i(x)$, $N_i(y)$, and $N_i(z)$:

[Equation 2]

$$D(X) = \sum_{i,j,k} A_{i,j,k} N_i^x(x) N_j^y(y) N_k^z(z) \tag{2}$$

Here, reference symbol $A_{i,j,k}$ denotes a B-Spline control point and a unknown value.

Furthermore, in equation (1), reference symbol E denotes energy preventing rampage, defined as follows:

[Equation 3]

$$E = E(A_{i,j,k}) = \sum_{i,j,k} \|A_{i,j,k} - d(u\_ijk, v\_ijk, w\_ijk)\|^2 \tag{3}$$

Namely,

[Equation 4]

$$d(u\_ijk, v\_ijk, w\_ijk) = \sum_{i,j,k} A_{i,j,k} N_i^u(u\_ijk) N_j^v(v\_ijk) N_k^w(w\_ijk) \tag{4}$$

Here, reference symbols u_ijk, v_ijk, w_ijk are Greville parameters for the control points $A_{i,j,k}$, respectively.

In this manner, the displacement function D(X), minimizing the value of M in Equation 1, is used as a displacement function when the group of points before modification (FIG. 6(a)) is displaced to the group points after modification (FIG. 6(b)).

According to this least square model, since B-Spline basis functions are used as the displacement functions, the curve surfaces of the three-dimensional model thus obtained become totally smooth.

(Gravity Force Model)

Next, the second calculation method of a gravity force model is explained with reference to FIGS. 8 through 11. In this gravity force model, it is conceived that each point of a group of points, representing a three-dimensional model, is influenced depending on the distance to a base curve, and a point closer to the base curve will be displaced further.

Figure 8:
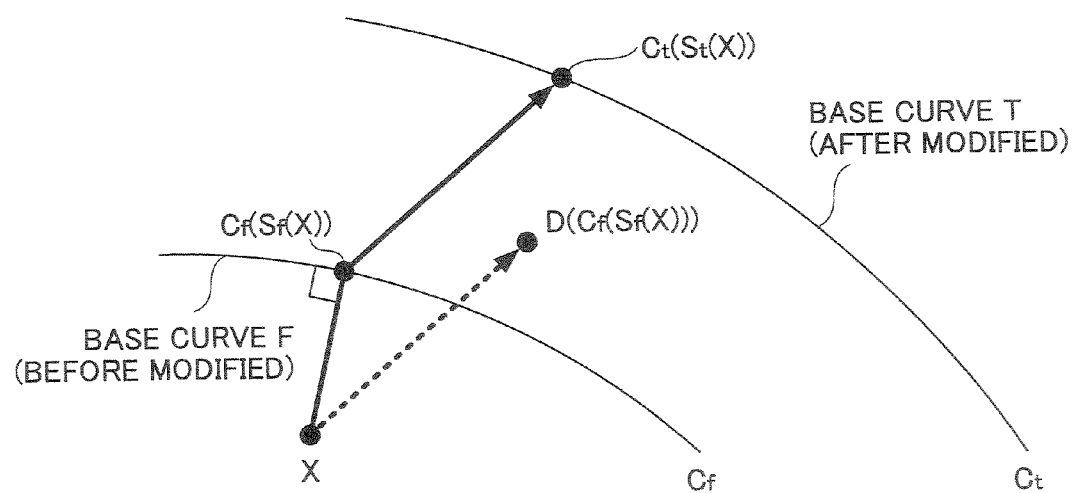
FIG. 8 is a drawing showing displacement of a group of points in another example (gravity force model) in step 204 in the flowchart in FIG. 2.

First, for simplifying purposes, the position of each point in a group of points after modification is determined in a small local portion as shown in FIG. 8 when each point of the group of points before modification is displaced in accordance with the displacement of the base curve from the base curve F to the base curve T.

Now, a line-length parameter of the base curve F that is not yet modified with respect to a point X of a group of points, or a foot-of-a-perpendicular parameter from the point X to the base line F before modification is expressed as $S_f(x)$. Then the base curve F can be expressed as $C_f(S_f(X))$ as a function of the parameter $S_f(x)$. Similarly, a base curve T after modification is expressed as $C_t(S_t(X))$ so that an equation $S_f(X)/L_f = S_t(X)/L_t$ is fulfilled. Here, reference symbols $L_f$ and $L_t$ denote line lengths of $C_f$ and $C_t$ respectively.

In accordance with the displacement from the base curve F to the base curve T, each point of the group of points before modification is displaced according to the displacement function D ($C_f(S_f(X))$). Namely, the point X is displaced to the point $(X+D(C_f(S_f(X))))$.

Figure 9:
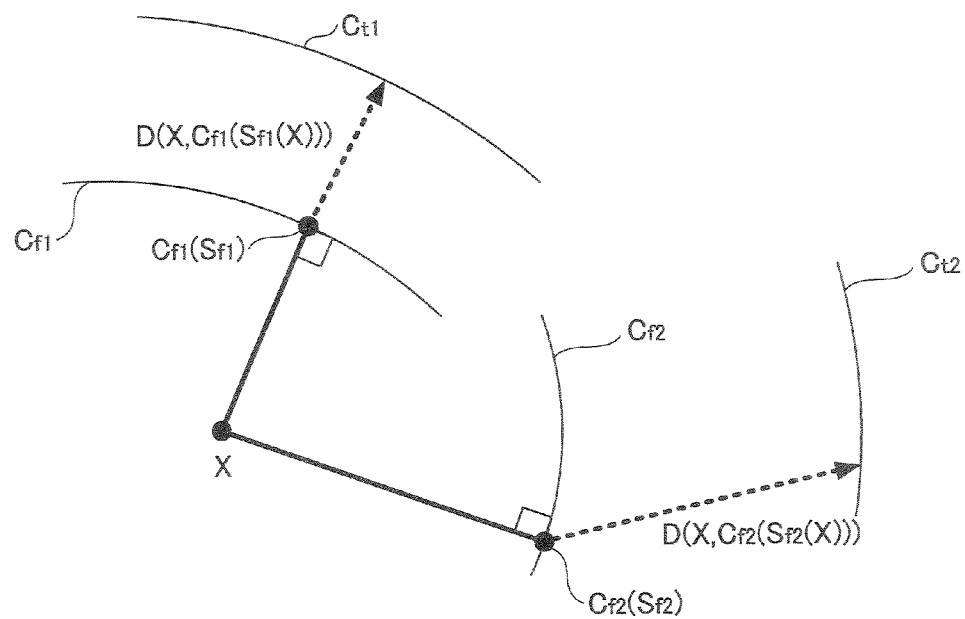
FIG. 9 is a drawing showing displacement of a group of points in another example (gravity force model) in step 204 in the flowchart in FIG. 2.

In an actual situation, there are plural base curves F that are not yet modified and plural base curves T after modification. Thus, the next case shown in FIG. 9 is considered. In FIG. 9, among the cases where two or more base curves F and two or more base curve T exist, the simplest case is shown where there are two base curves F and two base curves T.

When there are N base curves F, expressed as $C_{f1}(S_{f1})$, $C_{f2}(S_{f2})$, ..., $C_{fN}(S_{fN})$, a point that is on the $i^{th}$ base curve $C_{fi}$ before modification and that corresponds to a point X can be expressed as $C_{fi}(S_{fi}(X))$, and the displacement vector of the point $C_{fi}(S_{fi}(X))$ can be expressed as $D(X,C_{fi}(S_{fi}(X)))$.

Therefore, in a case of FIG. 9, a point that is on the first base curve $C_{f1}$ before modification and that corresponds to a point X can be expressed as $C_{f1}(S_{f1})$, and the displacement vector of the point $C_{f1}(S_{f1})$ can be expressed as $D(X,C_{f1}(S_{f1}))$. Similarly, a point that is on the second base curve $C_{f2}$ before modification and that corresponds to a point X can be expressed as $C_{f2}(S_{f2})$, and the displacement vector of the point $C_{f2}(S_{f2})$ can be expressed as $D(X,C_{f2}(S_{f2}))$.

Further, in this gravity force model, a weighting is applied to the displacement vector $D(X,C_{fi}(S_{fi}))$. Here, a weighting function applied to the displacement vector $D(X,C_{fi}(S_{fi}))$ is expressed as $W(X, C_{fi}(S_{fi}))$.

The weighting function is a typical weighting in which the value of weighting is inversely proportional to the square of the distance, defined as follows:

[Equation 5]

$$W(X, C_{fi}(S_{fi}(X))) = \frac{1}{\|X - C_{fi}(S_{fi}(X))\|^2} \quad (5)$$

In a case where there are plural base curves F before modification and plural base curves T after modification, the displacement vector D(X) at the point X is expressed as:

[Equation 6]

$$D(X) = \frac{\sum_i W(X, C_{fi}(S_{fi}(X)))D(X, C_{fi}(S_{fi}(X)))}{\sum_i W(X, C_{fi}(S_{fi}(X)))} \quad (6)$$

$$= \sum_i W_i(X)D(X, C_{fi}(S_{fi}(X)))$$

Here,

[Equation 7]

$$W_i(X) = \frac{W(X, C_{fi}(S_{fi}(X)))}{\sum_i W(X, C_{fi}(S_{fi}(X)))} \quad (7)$$

and

[Equation 8]

$$\sum_i W_i(X) = 1 \quad (8)$$

In the explanations above, a perpendicular parameter is used to determine the point that corresponds to the point X and that is on the base curve F before modification. However, there may be a case where a perpendicular cannot be drawn or where an inconvenient situation occurs depending on the number of curves even if each of them is a curve when viewed separately. To avoid the problems, an integration model is considered below.

Figure 10:
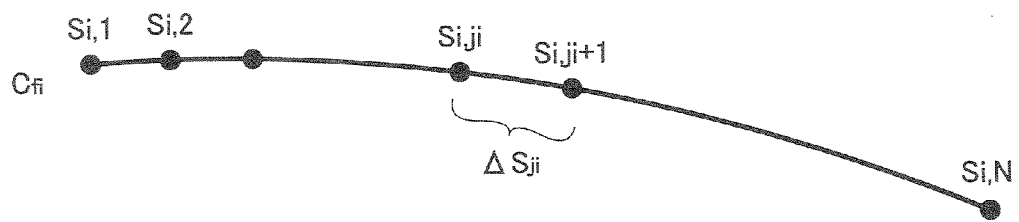
FIG. 10 is a drawing illustrating displacement of a group of points in another example (gravity force model) in step 204 in the flowchart in FIG. 2.

First, as shown in FIG. 10, one base curve F before modification ($i^{th}$ base curve $C_{fi}$ that is not yet modified) is divided into N minute lines $\Delta S$.

When $ji^{th}$ minute line $\Delta S_{ji}(=S_{i,ji+1}-S_{i,ji})$ is replaced by $C_{fi}(S_{fi})$, the displacement vector $D(X,C_{fi}(S_{fi}(X)))$ can be regarded as a displacement whose start point is $\Delta S_{ji}$ and can be expressed as follows:

[Equation 9]

$$D(X, C_{fi}(S_{fi}(X))) = D(C_{fi}(S_{i,ji})) \quad (9)$$

and

[Equation 10]

$$W(X, C_{fi}(S_{fi}(X))) = W(X, C_{fi}(S_{i,ji})) \quad (10)$$

$$= \frac{1}{\|X - C_{fi}(S_{i,ji})\|^2}$$

In above equation 10, as a tentative setting, the value of weighting is inversely proportional to the square of the distance.

Here, since one base curve F before modification consists of N minute lines $\Delta S_{ji}$, the displacement $F(C_{fi}(X))$ against the one base curve F before modification is expressed in an integration form as:

[Equation 11]

$$F(C_{fi}(X)) = \sum_{fi=1,2,...,N} W(X, C_{fi}(S_{i,ji}))\Delta S_{ji}D(C_{fi}(S_{i,fi})) \quad (11)$$

$$= \int_{C_{fi}} W(X, C_{fi}(S_{fi}))D(C_{fi})dS_{fi}$$

Further, in an actual situation, since there are base curves F before modification, the displacement $F(C_{fi}(X))$ with respect to all base curves F before modification is expressed in an integration form as:

[Equation 12]

$$F(C_{f1}(X), C_{f2}(X), \ldots, C_{fN}(X)) = \sum_i \int_{C_{fi}} W(X, C_{fi}(S_{fi}))D(C_{fi}(S_{fi}))dS_{fi} \quad (12)$$

Therefore, finally, the displacement vector D(X) is expressed as:

[Equation 13]

$$D(X) = \frac{\sum_i \int_{C_{fi}} W(C_{fi}, (S_{fi}))D(C_{fi}(S_{fi}))dS_{fi}}{\sum_i \int_{C_{fi}} W(X, C_{fi}(S_{fi}))dS_{fi}} \quad (13)$$

In above weighting function $W(X, C_{fi}(S_{fi}))$ the value of weighting is inversely proportional to the square of the distance. However, in this condition, even a point separated to some extent from a base curve is influenced by the base curve albeit only slightly. Namely, when viewed from any base curve, there is no point that is completely free from the influence of the base curve.

Therefore, as shown in the following equation 11 and FIG. 11, when a weighting function in which a point separated to some extent from a base curve is completely free from the influence of the base curve is used, the displacement in which the design intention is better kept is achieved.

[Equation 14]

$$W = \frac{1}{d^2} + \frac{1}{(d_s)^{\frac{1}{8}}} \ldots d \leq d_s \quad (14)$$
$$W = F(d) \ldots d_s \langle d \leq d_f$$
$$W = 0 \ldots d_f \langle d$$

In FIG. 11, the solid line represents the weighting function of equation 11, and the dotted line represents the weighting function in which a value of weighting is inversely proportional to the square of the distance. Here, the function F(d) draws a curve line smoothly connecting in the section $d_s < d \leq d_f$.

Further, regarding the weighting in the gravity force model, to increase the influence (gravity force) from a base line to a group of points in a specific section where the design intention is surely kept, an arbitrary line configuring the base curves may be duplicated into lines to double the gravity force from the line to increase the restraint force of the section.

According to the gravity force model, by defining the gravity force model function and duplicating the base curve as explained above, when the polygons are formed from a group of points before modification to generate the surfaces, a group of the surfaces thus generated are apt to be relatively closer to the base curves that have been modified.

The methods for displacing the group of points in step 204 (S204) are explained above by citing two concrete examples.

As explained, according to the embodiments of the present invention, by considering the fact that, in a case where a three-dimensional model in modified, since the constraint condition of the group of lines and the group of points is lower than that of the group of surfaces, the workload of the arithmetic processing can be lowered when the group of lines and the group of points are modified compared to when the group of surfaces which surfaces restrain each other is modified. The base curves consisting of plural curves are fit to the three-dimensional model that is a three-dimensional figure defined by plural surfaces, the group of points is generated from the three-dimensional model, and the group of points representing the three-dimensional model is displaced based on the desired modification applied to the base curves. Therefore, it is possible to, while considering the design intention and restraint conditions of the three-dimensional model, carry out the modification process in a shorter time and to facilitate the operations of the process.

The present invention can be widely used in a three-dimensional model modification system for modifying a three-dimensional model defined by plural surfaces, a method of the same, a computer-readable program of the same, and a computer-readable recording medium storing the program. An object of the three-dimensional model is not limited to a vehicle but may be any industrial product.

This international patent application is based on Japanese Priority Patent Application No. 2005-107722 filed on Apr. 4, 2005, and the entire contents of which are hereby incorporated by reference.

What is claimed is:

1. A three-dimensional model modification system for modifying a three-dimensional model, defined by a plurality of surfaces and representing an arbitrary object, the system comprising:
    a base-curve generating unit that fits skeleton lines, representing a prerecorded approximate outline of the object, to a three-dimensional model to be modified and generates base curves on a basis of the skeleton lines, representing an approximate outline of the three-dimensional model to be modified;
    a first polygon forming unit that forms polygons from free-form surfaces of the three-dimensional model to be modified and generates a group of points representing the free-form surfaces of the three-dimensional model to be modified;
    a base-curve modifying unit that arbitrarily modifies the base curves of the three-dimensional model, generated by the base-curve generating unit, according to an instruction from an operator;
    a group-of-points displacing/determining unit that displaces the group of points, generated by the first polygon forming unit and representing the three-dimensional model to be modified, based on base curve displacements from the base curves, generated by the base-curve generating unit before arbitrary modification, to the base curves, generated by the base-curve modifying unit after arbitrary modification, and determines the modified group of points corresponding to the displacement of the base curves, generated by the base-curve modifying unit after arbitrary modification; and
    a second polygon forming unit that forms new polygons from the modified group of points determined by the group-of-points displacing/determining unit and generates a three-dimensional model defined by a plurality of surfaces, generated from the new polygons.

2. The three-dimensional model modification system according to claim 1, the system further comprising:
a display unit showing that shows the operator the base curves before and after the modification, the group of points before and after the modification, and a modification process of the base curves, being modified by the base-curve modifying unit.

3. A three-dimensional model modification method for modifying a three-dimensional model, defined by a plurality of surfaces and representing an arbitrary object, the method comprising:
a base-curve generating step of fitting skeleton lines, representing a prerecorded approximate outline of the object, to a three-dimensional model to be modified and generating base curves on a basis of the skeleton lines, representing an approximate outline of the three-dimensional model to be modified;
a first polygon forming step of forming polygons from free-form surfaces of the three-dimensional model to be modified and generating a group of points representing the free-form surfaces of the three-dimensional model to be modified;
a base-curve modifying step of arbitrarily modifying, by an information processing apparatus, the base curves of the three-dimensional model, generated by the base-curve generating step, according to an instruction from an operator;
a group-of-points displacing/determining step of displacing, by the information processing apparatus, the group of points, generated by the first polygon forming step and representing the three-dimensional model to be modified, based on base curve displacements from the base curves, generated by the base-curve generating step before arbitrary modification, to the base curves, generated by the base-curve modifying step after arbitrary modification, and determining the modified group of points corresponding to the displacement of the base curves, generated by the base-curve modifying step after arbitrary modification; and
a second polygon forming step of forming new polygons from the modified group of points determined by the group-of-points displacing/determining step and generating a modified three-dimensional model defined by a plurality of surfaces, generated from the new polygons.

4. The three-dimensional model modification method according to claim 3, the method further comprising: a display step of showing the operator the base curves before and after the modification, the group of points before and after the modification, and a modification process of the base curves, being modified by the base-curve modifying step.

5. A non-transitory computer-readable recording medium storing a computer-readable three-dimensional model modification program for modifying a three-dimensional model, defined by a plurality of surfaces and representing an arbitrary object, the computer-readable three-dimensional model modification program, when executed by a computer, causing the computer to execute processes, the processes comprising:
a base-curve generating process of fitting skeleton lines, representing a prerecorded approximate outline of the object, to a three-dimensional to be modified and generating base curves on a basis of the skeleton lines, representing an approximate outline of the three-dimensional model to be modified;
a first polygon forming process of forming polygons from free-form surfaces of the three-dimensional model to be modified and generating a group of points representing the surfaces of the three-dimensional model to be modified;
a base-curve modifying process of arbitrarily modifying the base curves of the three-dimensional model, generated by the base-curve generating process, according to an instruction from an operator;
a group-of-points displacing/determining process of displacing the group of points, generated by the first polygon forming process and representing the three-dimensional model to be modified, based on base curve displacements from the base curves, generated by the base-curve generating process before arbitrary modification, to the base curves, generated by the base-curve modifying process after arbitrary modification, and determining the modified group of points corresponding to the displacement of the base curves, generated by the base-curve modifying process after arbitrary modification; and
a second polygon forming process of forming new polygons from the modified group of points determined by the group-of-points displacing/determining process and generating a modified three-dimensional model defined by a plurality of surfaces, generated from the new polygons.

* * * * *